United States Patent
Zimmet et al.

(10) Patent No.: US 9,853,824 B2
(45) Date of Patent: Dec. 26, 2017

(54) INJECTING CONTENT IN COLLABORATION SESSIONS

(75) Inventors: Carol Sue Zimmet, Boxborough, MA (US); Ruthie D. Lyle, Durham, NC (US); Patrick Joseph O'Sullivan, Ballsbridge (IE); Fred Raguillat, Dunboyne (IE)

(73) Assignee: International Business Machines Corporation, Armonk, NY (US)

( * ) Notice: Subject to any disclaimer, the term of this patent is extended or adjusted under 35 U.S.C. 154(b) by 1008 days.

(21) Appl. No.: 13/224,865

(22) Filed: Sep. 2, 2011

(65) Prior Publication Data
US 2013/0060849 A1    Mar. 7, 2013

(51) Int. Cl.
G06F 15/16 (2006.01)
H04L 12/18 (2006.01)
G06Q 10/10 (2012.01)

(52) U.S. Cl.
CPC ....... H04L 12/1822 (2013.01); G06Q 10/103 (2013.01)

(58) Field of Classification Search
CPC .............. H04L 12/1822; H04L 29/06; H04L 29/08072; G06Q 10/103; G06Q 10/10
See application file for complete search history.

(56) References Cited

U.S. PATENT DOCUMENTS

| | | |
|---|---|---|
| 6,393,460 B1 | 5/2002 | Gruen et al. |
| 7,603,413 B1 * | 10/2009 | Herold ............... G06Q 10/10 455/466 |
| 8,055,710 B2 | 11/2011 | Shook et al. |
| 8,423,602 B2 * | 4/2013 | Goodman ............ H04L 63/101 709/203 |
| 8,495,507 B2 | 7/2013 | Schneider |
| 8,937,888 B2 * | 1/2015 | Foo ..................... H04L 12/1822 370/260 |

(Continued)

OTHER PUBLICATIONS

IBM, "System to Allow for Intuitive Initiation of a New IM (Instant Messaging) Conversation from Within the Context of the Current IM Conversation," ip.com, IPCOM000190144D, Nov. 18, 2009, pp. 1-4.

(Continued)

*Primary Examiner* — Younes Naji
(74) *Attorney, Agent, or Firm* — Brian J. Colandreo, Esq.; Jeffrey T. Placker, Esq.; Holland & Knight LLP

(57) ABSTRACT

A method, computer program product, and system for injecting content in collaboration sessions is described. A method may comprise receiving, via one or more computing devices, a request from a third party to inject content into a collaboration session between two or more users. The method may further comprise monitoring, via the one or more computing devices, one or more communication platforms to detect a qualifying event associated with the request from the third party to inject the content into the collaboration session between the two or more users. The method may additionally comprise, in response, at least in part, to detecting the qualifying event associated with the request from the third party to inject the content into the collaboration session between the two or more users, injecting, via the one or more computing devices, the content into the collaboration session between the two or more users.

21 Claims, 6 Drawing Sheets

(56) References Cited

U.S. PATENT DOCUMENTS

| | | | |
|---|---|---|---|
| 2002/0103647 A1* | 8/2002 | Houplain | G10L 15/26 704/260 |
| 2007/0180029 A1* | 8/2007 | Croak | H04M 3/567 709/204 |
| 2008/0005325 A1* | 1/2008 | Wynn | G06Q 10/107 709/225 |
| 2008/0168138 A1 | 7/2008 | Simpson | |
| 2009/0106368 A1* | 4/2009 | Padveen | G06Q 10/107 709/206 |
| 2009/0234972 A1 | 9/2009 | Raghu et al. | |
| 2009/0265431 A1 | 10/2009 | Jania et al. | |
| 2010/0042424 A1* | 2/2010 | Turakhia | G06Q 10/107 705/14.54 |
| 2010/0094630 A1* | 4/2010 | Yoakum | G06F 17/30746 704/254 |
| 2010/0205541 A1 | 8/2010 | Rapaport et al. | |
| 2011/0078717 A1* | 3/2011 | Drummond | H04N 21/4586 725/14 |

OTHER PUBLICATIONS

IBM, "System for Managing or Modifying the Behaviour of Electronic Messages," ip.com, IPCOM000172105D, Jun. 27, 2008, pp. 1-2.

IBM, "Salutation and Trailer for Instant Messaging," ip.com, IPCOM000180259D, Mar. 5, 2009, pp. 1-3.

"Method and System is Disclosed for Alerting/Notifying Users about One or More Events Which May be of Interest to the One or More Users" IP.com, http://priorartdatabase.com/IPCOM/000197723, Published Jul. 20, 2010, pp. 1-3.

* cited by examiner

INJECTING CONTENT IN COLLABORATION SESSIONS

BACKGROUND OF THE INVENTION

Collaborative sessions, such as instant message chats, unified telephony calls, and web conferences, may be ways for collaborators to share ideas and have discussions. While collaborators present in a collaborative session may take advantage of the resulting collaboration opportunity, those outside (e.g., not invited to, not present for) the collaborative session may be unable to share ideas or influence the flow of discussions in the collaboration session. In some situations, those outside the collaborative session may not have knowledge that a collaborative session is taking place, or may not know who is collaborating in the collaborative session.

BRIEF SUMMARY OF THE INVENTION

In an embodiment, a method may include receiving, via one or more computing devices, a request from a third party to inject content into a collaboration session between two or more users. The method may further include monitoring, via the one or more computing devices, one or more communication platforms to detect a qualifying event associated with the request from the third party to inject the content into the collaboration session between the two or more users. The method may also include, in response, at least in part, to detecting the qualifying event associated with the request from the third party to inject the content into the collaboration session between the two or more users, injecting, via the one or more computing devices, the content into the collaboration session between the two or more users.

One or more of the following features may be included. The method may include storing the request from the third party to inject the content into the collaboration session between the two or more users in a registry. Injecting the content into the collaboration session between the two or more users may include displaying the content requested by the third party to be injected into the collaboration session between the two or more users in the collaboration session between the two or more users. The method may additionally include identifying the third party that requested to inject the content into the collaboration session between the two or more users to the two or more users.

Detecting the qualifying event associated with the request from the third party to inject the content into the collaboration session between the two or more users may include detecting that the two or more users are in the collaboration session, wherein the request from the third party to inject the content into the collaboration session between the two or more users identifies the two or more users. Detecting the qualifying event associated with the request from the third party to inject the content into the collaboration session between the two or more users may also include detecting a topic of the collaboration session between the two or more users, wherein the request from the third party to inject the content into the collaboration session between the two or more users identifies the topic. Detecting the qualifying event associated with the request from the third party to inject the content into the collaboration session between the two or more users may additionally include detecting a fuzzy match associated with: the request to inject the content into the collaboration session between the two or more users, and the qualifying event.

In an implementation, the method may include notifying the third party that requested to inject the content into the collaboration session between the two or more users of whether an action associated with the request to inject the content into the collaboration session between the two or more users was satisfied. The method may also include notifying the third party that requested to inject the content into the collaboration session between the two or more users that the qualifying event has been detected. The collaboration session may be at least one of: a telephone call, an instant message chat, a conference call, a unified telephony call, a web conference, an electronic meeting, an email, and a calendaring and scheduling event.

In an embodiment, a computer program product may reside on a computer readable storage medium and may have a plurality of instructions stored on it. When executed by a processor, the instructions may cause the processor to perform operations including receiving a request from a third party to inject content into a collaboration session between two or more users. The operations may further include monitoring one or more communication platforms to detect a qualifying event associated with the request from the third party to inject the content into the collaboration session between the two or more users. The operations may also include, in response, at least in part, to detecting the qualifying event associated with the request from the third party to inject the content into the collaboration session between the two or more users, injecting the content into the collaboration session between the two or more users.

One or more of the following features may be included. The operations may include storing the request from the third party to inject the content into the collaboration session between the two or more users in a registry. Injecting the content into the collaboration session between the two or more users may include displaying the content requested by the third party to be injected into the collaboration session between the two or more users in the collaboration session between the two or more users. The operations may additionally include identifying the third party that requested to inject the content into the collaboration session between the two or more users to the two or more users.

Detecting the qualifying event associated with the request from the third party to inject the content into the collaboration session between the two or more users may include detecting that the two or more users are in the collaboration session, wherein the request from the third party to inject the content into the collaboration session between the two or more users identifies the two or more users. Detecting the qualifying event associated with the request from the third party to inject the content into the collaboration session between the two or more users may also include detecting a topic of the collaboration session between the two or more users, wherein the request from the third party to inject the content into the collaboration session between the two or more users identifies the topic. Detecting the qualifying event associated with the request from the third party to inject the content into the collaboration session between the two or more users may additionally include detecting a fuzzy match associated with: the request to inject the content into the collaboration session between the two or more users, and the qualifying event.

In an implementation, the operations may include notifying the third party that requested to inject the content into the collaboration session between the two or more users of whether an action associated with the request to inject the content into the collaboration session between the two or more users was satisfied. The operations may also include notifying the third party that requested to inject the content into the collaboration session between the two or more users that the qualifying event has been detected. The collaboration session may be at least one of: a telephone call, an instant message chat, a conference call, a unified telephony call, a web conference, an electronic meeting, an email, and a calendaring and scheduling event.

In an embodiment, a computing system is provided. The computing system may include at least one processor and at least one memory architecture coupled with the at least one processor. The computing system may also include a first software module executable by the at least one processor and the at least one memory architecture, wherein the first software module may be configured to receive a request from a third party to inject content into a collaboration session between two or more users. Further, the computing system may include a second software module which may be configured to monitor one or more communication platforms to detect a qualifying event associated with the request from the third party to inject the content into the collaboration session between the two or more users. Additionally, the computing system may include a third software module which may be configured to in response, at least in part, to detecting the qualifying event associated with the request from the third party to inject the content into the collaboration session between the two or more users, inject the content into the collaboration session between the two or more users.

One or more of the following features may be included. The computing system may include a fourth software module which may be configured to store the request from the third party to inject the content into the collaboration session between the two or more users in a registry. Moreover, the computing system may include a fifth software module which may be configured to display the content requested by the third party to be injected into the collaboration session between the two or more users in the collaboration session between the two or more users. Further, the computing system may include a sixth software module which may be configured to identify the third party that requested to inject the content into the collaboration session between the two or more users to the two or more users.

In an embodiment, a method may include receiving, via one or more computing devices, a request through, at least in part, a graphical user interface associated with a collaboration application, to inject content into a collaboration session between two or more users. The method may also include monitoring, via the one or more computing devices, one or more communication platforms to detect a qualifying event associated with the request from the third party to inject the content into the collaboration session between two or more users based upon, at least in part, at least one of: an identity of the two or more users, and a topic of the collaboration session. The method may additionally include in response, at least in part, to detecting the qualifying event associated with the request from the third party to inject the content into the collaboration session between the two or more users, injecting, via the one or more computing devices, the content into the collaboration session between the two or more users through, at least in part, at least one of an instant messaging application, a unified telephony application, a web conferencing application, and a text message.

The details of one or more implementations are set forth in the accompanying drawings and the description below. Other features and advantages will become apparent from the description, the drawings, and the claims.

DETAILED DESCRIPTION OF THE INVENTION

Figure 1:
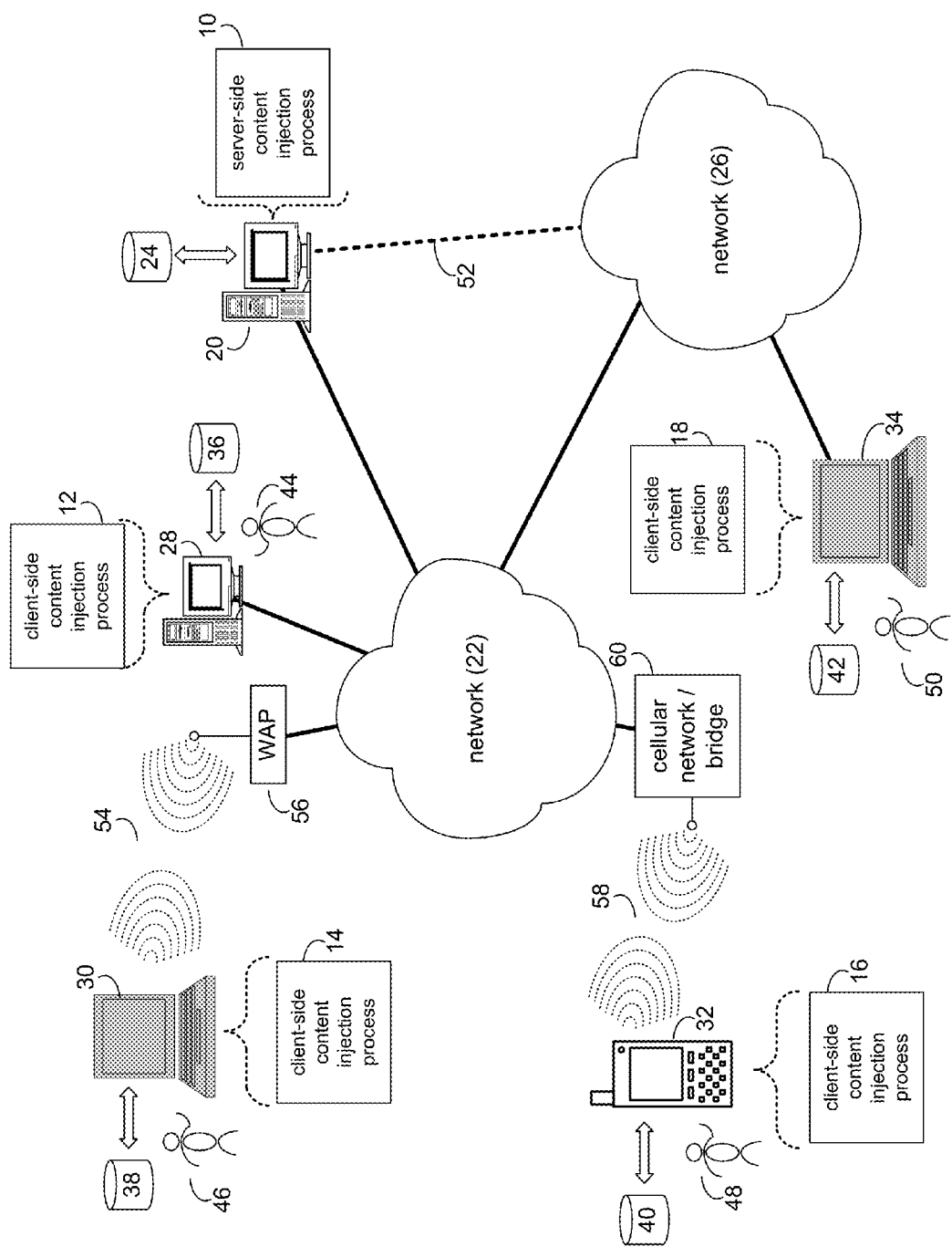
FIG. 1 is a diagrammatic view of a content injection process coupled to a distributed computing network.
Figure 2:
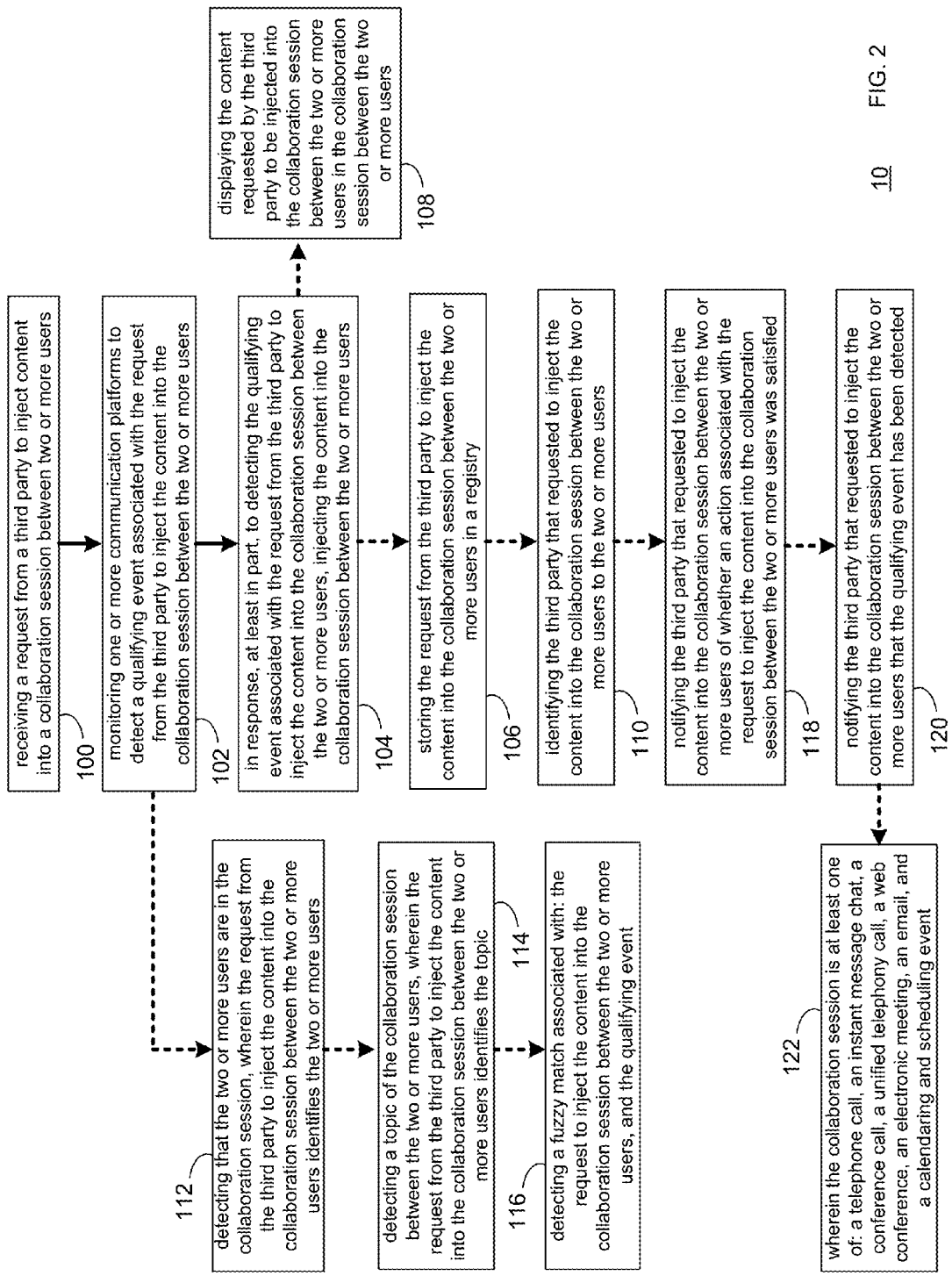
FIG. 2 is a flowchart of the content injection process of FIG. 1.

Referring to FIGS. 1 & 2, there is shown a content injection process 10. As will be discussed below, content injection process 10 may receive 100, a request from a third party to inject content into a collaboration session between two or more users. Content injection process 10 may also monitor 102 one or more communication platforms to detect a qualifying event associated with the request from the third party to inject the content into the collaboration session between the two or more users. Content injection process 10 may additionally, in response to detecting the qualifying event associated with the request from the third party to inject the content into the collaboration session between the two or more users, inject 104 the content into the collaboration session between the two or more users.

The content injection (CI) process may be a server-side process (e.g., server-side CI process 10), a client-side process (e.g., client-side CI process 12, client-side CI process 14, client-side CI process 16, or client-side CI process 18), or a hybrid server-side/client-side process (e.g., the combination of server-side CI process 10 and one or more of client-side CI processes 12, 14, 16, 18).

Server-side CI process 10 may reside on and may be executed by server computer 20, which may be connected to network 22 (e.g., the Internet or a local area network). Examples of server computer 20 may include, but are not limited to: a personal computer, a server computer, a series of server computers, a mini computer, and/or a mainframe computer. Server computer 20 may be a web server (or a series of servers) running a network operating system, examples of which may include but are not limited to: Microsoft Windows Server; Novell Netware; or Red Hat Linux, for example.

The instruction sets and subroutines of server-side CI process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a RAID array; a random access memory (RAM); and a read-only memory (ROM).

Server computer 20 may execute a web server application, examples of which may include but are not limited to: Microsoft IIS, Novell Web Server, or Apache Web Server, that allows for access to server computer 20 (via network 22) using one or more protocols, examples of which may include but are not limited to HTTP (i.e., HyperText Transfer Protocol), SIP (i.e., session initiation protocol), and the Lotus® Sametime® VP protocol. Additionally, server computer 20 may execute an online meeting product, examples of which may include, but are not limited to, Lotus® Sametime® Meetings, LotusLive™ Meetings, or GoToMeeting®. Network 22 may be connected to one or more secondary networks (e.g., network 26), examples of which may include but are not limited to: a local area network; a wide area network; or an intranet, for example.

Client-side CI processes 12, 14, 16, 18 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 22 and/or network 26 and may each execute an operating system, examples of which may include but are not limited to Microsoft® Windows®, Microsoft® Windows® CE, Red Hat® Linux, Apple® Mac OS®, Apple® iOS, Google Android™, or a custom operating system.

The instruction sets and subroutines of client-side CI processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

Client-side CI processes 12, 14, 16, 18 and/or server-side CI process 10 may be processes that run within (i.e., are part of) a unified communications and collaboration application (e.g., Lotus® Sametime® and/or LotusLive™ Meetings Mobile). Alternatively, client-side CI processes 12, 14, 16, 18 and/or server-side CI process 10 may be stand-alone applications that work in conjunction with the unified communications and collaboration application application. One or more of client-side CI processes 12, 14, 16, 18 and server-side CI process 10 may interface with each other (via network 22 and/or network 26).

Users 44, 46, 48, 50 may access server-side CI process 10 directly through the device on which the client-side CI process (e.g., client-side CI processes 12, 14, 16, 18) is executed, namely client electronic devices 28, 30, 32, 34, for example. Users 44, 46, 48, 50 may access server-side CI process 10 directly through network 22 and/or through secondary network 26. Further, server computer 20 (i.e., the computer that executes server-side CI process 10) may be connected to network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The Content Injection (CI) Process

For the following discussion, server-side CI process 10 will be described for illustrative purposes. It should be noted that client-side CI process 12 may be interact with server-side CI process 10 and may be executed within one or more applications that allow for communication with client-side CI process 12. However, this is not intended to be a limitation of this disclosure, as other configurations are possible (e.g., stand-alone, client-side CI processes and/or stand-alone server-side CI processes.) For example, some implementations may include one or more of client-side CI processes 12, 14, 16, 18 in place of or in addition to server-side CI process 10.

Figure 4:
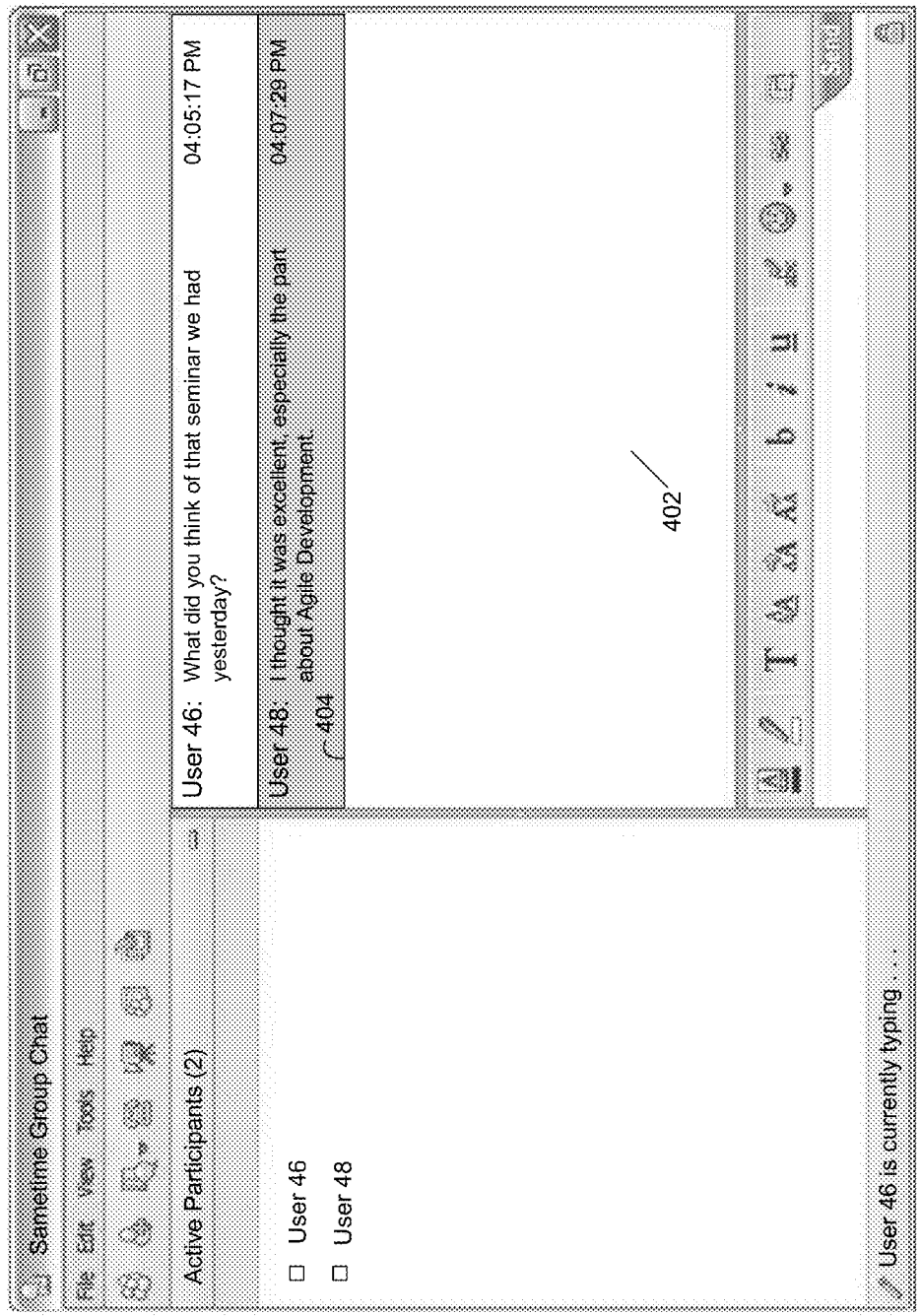
FIG. 4 is also an example graphical user interface which may be associated with the content injection process of FIG. 1.

One or more of users 44, 46, 48, and 50 may collaborate via a unified communications and collaboration application (e.g., Lotus® Sametime® and/or LotusLive™ Meetings Mobile). One or more of users 44, 46, 48, and 50 may collaborate via an instant message (IM) chat, a conference call, a unified telephony call, a web conference, an electronic meeting, an email, and a calendaring and scheduling event, one or more of which may be available via the unified communications and collaboration application (e.g., Lotus® Sametime® and/or LotusLive™ Meetings Mobile). In some situations, two or more of users 44, 46, 48, and 50 may have a collaboration session (e.g., via IM chat). For example, and as shown in FIG. 4, users 46 and 48 may collaborate via IM chat graphical user interface (GUI) 400. User 44 may also wish to collaborate with users 46 and 48 via the IM chat, however user 44 may not be included in the IM chat for multiple reasons.

For example, user 44 may not be available during the IM chat between users 46 and 48 or user 44 may not be actively needed in the IM chat. However, user 44 may want to make sure that certain content is exchanged between users 46 and 48. In other words, user 44 may wish to drive the flow of communication during the collaboration between users 46 and 48 via the IM chat.

Figure 3:
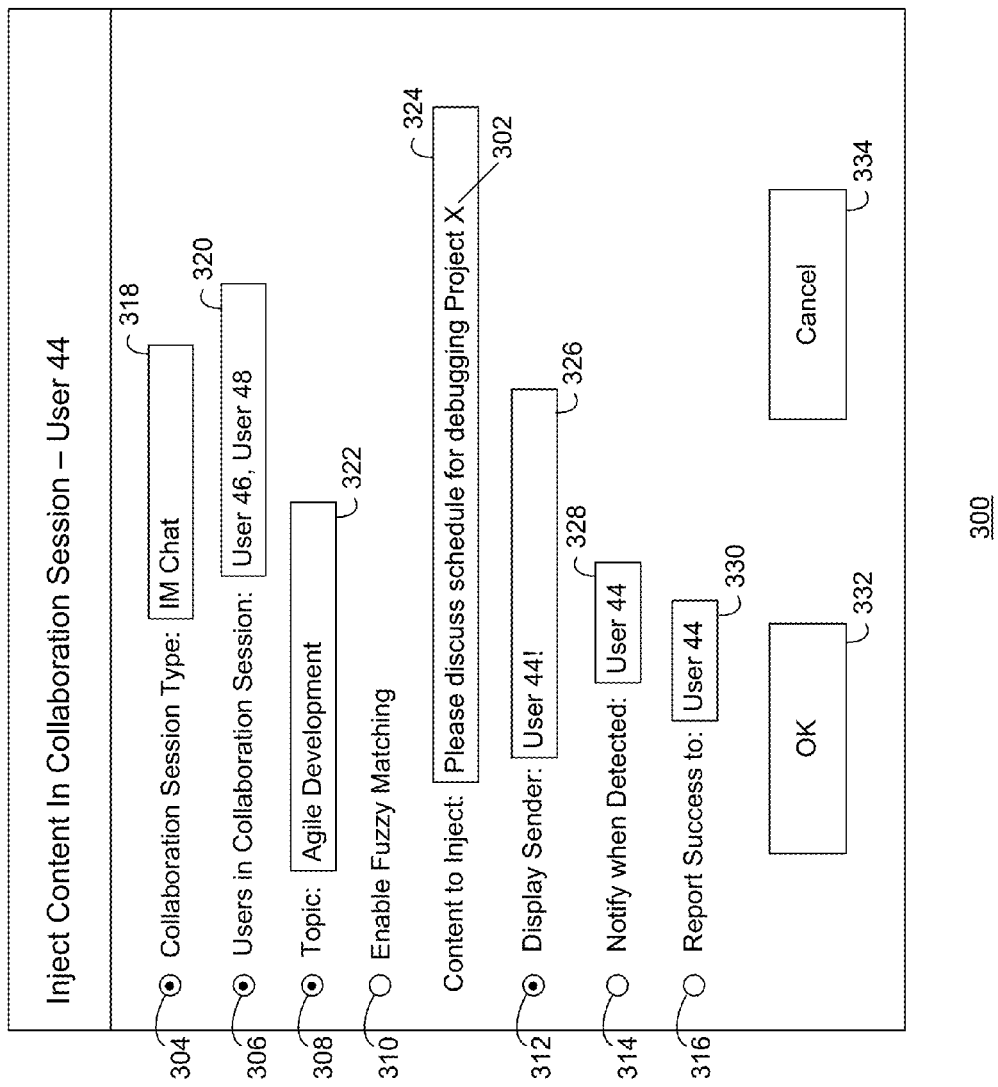
FIG. 3 is an exemplary graphical user interface which may be associated with the content injection process of FIG. 1.

Referring now to FIGS. 2-4, CI process 10 may receive 100 a request (e.g., via GUI 300) from a third party (e.g., user 44) to inject content (e.g., content 302) into a collaboration session (e.g., IM chat 402) between two or more users (e.g., users 46 and 48). GUI 400, which may be associated with a unified communications and collaboration application, may allow users 46 and 48 to collaborate and/or communicate via IM chat 402.

While IM chat 402 will be discussed herein to describe various features of the present disclosure, this is for illustrative purposes only, as the features of the present disclosure may also operate with one or more of a conference call, a unified telephony call, a web conference, an electronic meeting, an email, and a calendaring and scheduling event. In other words, the collaboration session as discussed herein may be (122) at least one of: a telephone call, an instant message chat, a conference call, a unified telephony call, a web conference, an electronic meeting, an email, and a calendaring and scheduling event. It should be noted that while the term "IM chat" may refer to the collaboration session depicted in FIG. 4, the terms "IM chat", "IM", "chat", and "group chat" may be used interchangeably herein, and may all refer to a form of instant messaging.

GUI 300, which may also be associated with and may be available from the unified communications and collaboration application, may allow user 44 to request to inject content (e.g., content 302) into a collaboration session (e.g., IM chat 402). While content 302 is shown here as text, content 302 may be any type of electronic content used in collaboration sessions including, but not limited to, one or more of video, audio, and/or an image.

In an example, user 44 may be a manager of user 46 and/or 48 and may wish to inject content (e.g., content 302) the next time that users 46 and 48 collaborate. User 44 may select one or more options via, e.g., radio buttons 304-316 and may enter input into one or more of, e.g., text boxes 318-330 to configure how content 302 may be injected into a collaboration session (e.g., IM chat 402). While radio buttons 304-316 and text boxes 318-330 are discussed herein, GUI 300 may include any type of GUI control element, including, but not limited to, drop-down lists, list boxes, combo boxes, and check boxes, which may allow user 44 to configure how content 302 may be injected into a collaboration session (e.g., IM chat 402).

For example, user 44 may select radio button 304 and may enter "IM chat" into text box 318 in order to select a collaboration session type for injecting content 302. Further, user 44 may select radio button 306 and may enter "User 46, User 48", in order select who should be collaborating when content 302 is injected. User 44 may configure each option in GUI 300, and may select button 332 to enter the request to inject content 302 into a collaboration session. In an implementation, in response to user 44 selecting button 332, CI process 10 may receive 100 the request (e.g., via GUI 300) from the third party (e.g., user 44) to inject content (e.g., content 302) into the collaboration session (e.g., IM chat 402) between two or more users (e.g., users 46 and 48).

CI process 10 may also store 106 the request (e.g., received via GUI 300) from the third party (e.g., user 44) to inject the content (e.g., content 302) into the collaboration session (e.g., IM chat 402) between the two or more users (e.g., users 46 and 48) in a registry. The registry may be stored in a central database associated with the unified communications and collaboration application and accessible by one or more of client electronic devices 28, 30, 32, and/or 34, which may be used by one or more of users 44, 46, 48, and/or 50, respectively. In an implementation, the registry may be stored on a server computer (e.g., server computer 20) associated with the unified communications and collaboration application. Also, in an implementation, the registry may be distributed and stored locally at one or more of client electronic devices 28, 30, 32, and/or 34. Also, in an implementation, recent registers associated with recent requests may be stored locally, and registers associated with less recent requests may be stored on the serve computer (e.g., server computer 20).

Further, CI process 10 may monitor 104 one or more communication platforms to detect a qualifying event associated with the request (received, via, e.g., GUI 300) from the third party (e.g., user 44) to inject the content (e.g., content 302) into the collaboration session (e.g., IM chat 402) between the two or more users (e.g., users 46 and 48). The one or more communication platforms may be associated with and/or available via the unified communications and collaboration application and may be, for example, one or more of an IM platform, a conference call platform, a unified telephony platform, a web conference platform, an electronic meeting platform, an email platform, and a calendaring and scheduling platform. The qualifying event may be, for example, based upon, at least in part, the configuration selected by a user (e.g., user 44) via GUI 300.

For example, if user 44 selected, via, e.g., GUI 300, that content 302 should be injected into an IM chat between users 46 and 48, then the qualifying event may be the initiation of an IM chat between users 46 and 48. If user 44 selected, via, e.g., GUI 300 that content 302 should be injected into a web conference between users 46 and 48, the qualifying event may be the initiation of a web conference between users 46 and 48. If user 44 selected, via, e.g., GUI 300, that content 302 should be injected into an IM chat between users 46 and 48 if users 46 and 48 are discussing the topic of "Agile Development", then the qualifying event may be the term "Agile Development" being entered into an IM chat between users 46 and 48.

In an implementation, CI process 10 may deploy one or more software implemented agents configured to monitor 104 one or more communication platforms to detect the qualifying event. The one or more software implemented agents may detect when criteria associated with registered requests are met. For instance, in the example described above, one or more agents may detect that IM chat 402 between users 46 and 48 has been initiated. Since this may be a qualifying event for the request described in connection with user 44 and GUI 302, the one or more agents may detect that criteria associated with a registered request has been met.

As discussed above, CI process 10 may detect the qualifying event associated with a registered request to inject content. In an implementation, CI process 10 may detect 112 that the two or more users (e.g., users 46 and 48) are in the collaboration session (e.g., IM chat 402). The request (e.g., via GUI 300) from the third party (e.g., user 44) to inject the content (e.g., content 302) into the collaboration session (e.g., IM chat 402) between the two or more users (e.g., users 46 and 48) may identify (e.g., via text box 320) the two or more users (e.g., users 46 and 48). Additionally and/or alternatively, CI process 10 may detect 114 a topic (e.g., "Agile Development" as entered in text box 322) of the collaboration session (e.g., IM chat 402) between the two or more users (e.g., users 46 and 48). The request (e.g., via GUI 300) from the third party (e.g., user 44) to inject the content (e.g., content 302) into the collaboration session (e.g., IM chat 402) between the two or more users (e.g., users 46 and 48) may identify (e.g., via text box 322) the topic (e.g., "Agile Development" as entered in text box 322). Continuing with the above example, and referring now also to FIG. 4, assume for illustrative purposes that users 46 and 48 are collaborating in IM chat 402 via GUI 400. Further, assume that user 48 enters the text "Agile Development" in entry 404. CI process 10 may detect a qualified event associated with a registered request received, e.g., via GUI 300. In other words, the situation surrounding IM chat 402 may be detected as a qualifying event.

In an embodiment, CI process 10 may detect 116, a fuzzy match associated with the request (e.g., via GUI 300) to inject the content (e.g., content 302) into the collaboration session (e.g., IM chat 402) between the two or more users (e.g., users 46 and 48), and the qualifying event. For example, user 44 may enable the fuzzy matching feature of CI process 10 by selecting radio button 310 via GUI 300. A fuzzy match may be, for example, a collaboration session situation that may not match each criterion of a registered request to inject content into a collaboration session, but that may match enough of the criteria of the registered request such that the situation surrounding the collaboration session suffices as a qualifying match.

Figure 5:
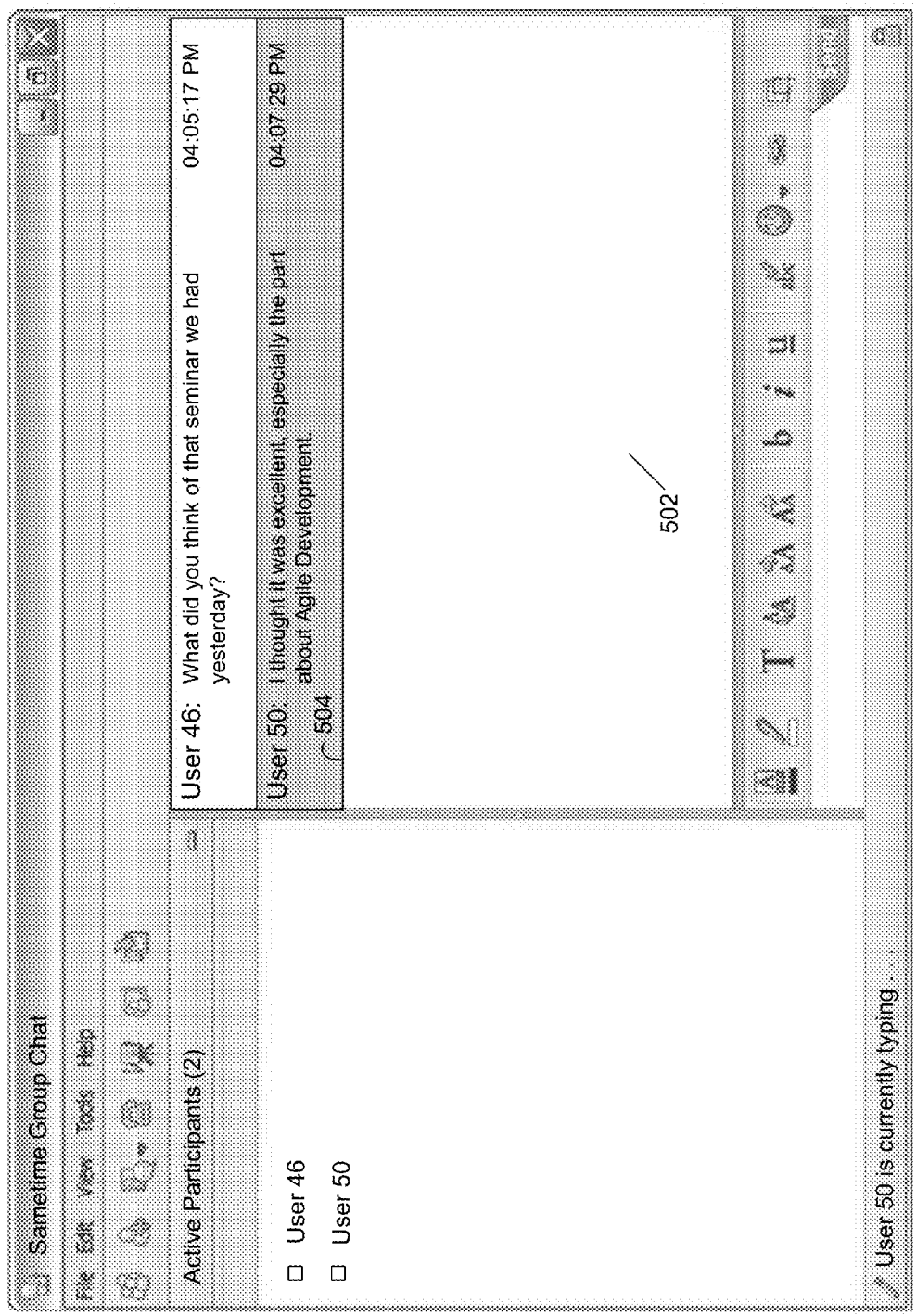
FIG. 5 is also an example graphical user interface which may be associated with the content injection process of FIG. 1.

For example, and referring now to FIG. 5, assume for illustrative purposes that users 46 and 50 collaborate in IM chat 502 via GUI 500. Further, assume that user 50 enters the text "Agile Development" in entry 504. CI process 10 may detect a qualifying event associated with a registered request received, e.g., via GUI 300 in connection with IM chat 502 if fuzzy matching is enabled. In other words, CI process 10 may determine that since users 46 and 50 are discussing "Agile Development" via IM chat 502, IM chat 502 may be a fuzzy match with respect to the registered request received, e.g., via GUI 300 as the only difference between the registered request and IM chat 502 is that user 50 is involved rather than user 48. In an implementation, CI process 10 may allow a user to configure fuzzy matching parameters such that fuzzy matches are made as defined by the user.

Figure 6:
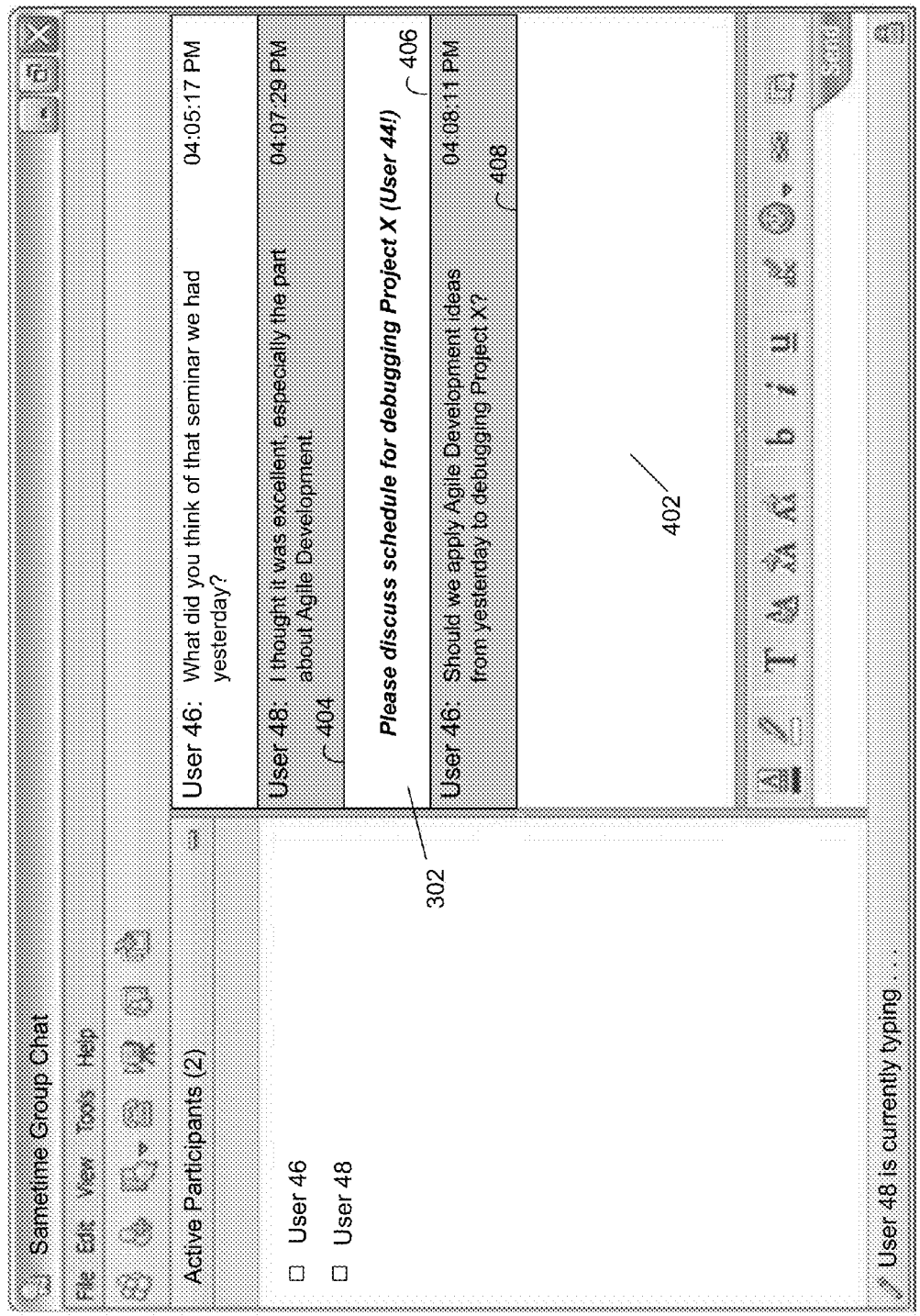
FIG. 6 is also an exemplary graphical user interface which may be associated with the content injection process of FIG. 1.

In response, at least in part, to detecting the qualifying event associated with the request (received via, e.g., GUI 300) from the third party (e.g., user 44) to inject the content (e.g., content 302) into the collaboration session (e.g., IM chat 402) between the two or more users (e.g., users 46 and 48), CI process 10 may inject 104 the content (e.g., content 302) into the collaboration session (e.g., IM chat 402) between the two or more users (e.g., users 46 and 48). Referring now also to FIG. 6, if CI process 10 detects a qualifying event in connection with IM chat 402, CI process 10 may inject 104 content 302 into IM chat 402. For example, CI process 10 may inject 104 content 302 in entry 406 of IM chat 402. Users 46 and/or 48 may view content 302 added by user 44, and may collaborate on and/or discuss content 302. In this way, CI process 10 may display 108 the content requested (via, e.g., GUI 300) by the third party (e.g., user 44) to be injected into the collaboration session (e.g., IM chat 402) between the two or more users (e.g., users 46 and 48) in the collaboration session (e.g., IM chat 402) between the two or more users (e.g., users 46 and 48). While content 302 is shown in IM chat 402 as being viewable to both users 46 and 48, user 44 may configure content 302 to be viewable by only one of users 46 and 48 via, e.g., GUI 300.

It should be noted that while the term "inject" as used herein may describe displaying content selected by a third party in a collaboration session, other variations are possible. For example, if the content includes a video, audio, an image, or a file, injecting the content may include linking the content in the collaboration session, embedding a file associated with the content in the collaboration session, or rendering the content in the collaboration session via a media player application or applet.

In an embodiment, CI process 10 may identify 110 the third party (e.g., user 44) that requested (via, e.g., GUI 300) to inject the content (e.g., content 302) into the collaboration session (e.g., IM chat 402) between the two or more users (e.g., users 46 and 48) to the two or more users (e.g., users 46 and 48). For example, as shown in FIG. 3, user 44 may select radio button 312, and may enter text in text box 326 to describe user 44. As shown in FIG. 6, CI process 10 may identify 110 user 44 by inserting "(User 44!)" in IM chat 402 as requested by user 44 in GUI 300. User 44 may enter any description desired in text box 326 including, but not limited to, "manager", "supervisor", etc.

Further, in an embodiment, CI process 10 may notify 118 the third party (e.g., user 44) that requested (via, e.g., GUI 300) to inject the content (e.g., content 302) into the collaboration session (e.g., IM chat 402) between the two or more users (e.g., users 46 and 48) of whether an action associated with the request (e.g., via text box 324) to inject the content (e.g., content 302) into the collaboration session (e.g., IM chat 402) between the two or more users (e.g., users 46 and 48) was satisfied. For example, as shown in FIG. 3, user 44 may select radio button 316 and may enter text in text box 328 to be notified if the action is satisfied. As shown in IM chat 402, the content selected to be injected by user 44 may be "Please discuss schedule for debugging Project X". CI process 10 may determine that this content may have an associated action corresponding to discussing "debugging Project X" in the collaboration session. As such, if CI process 10 determines that users 46 and 48 discussed "debugging Project X" in IM chat 402 (e.g., as shown in entry 408), CI process 10 may notify 118 user 44 that the action associated with text box 324 and/or content 302 has been satisfied. CI process 10 may notify user 44 via one or more of the communication platforms discussed herein.

In an implementation, CI process 10 may notify 120 the third party (e.g., user 44) that requested (via, e.g., GUI 300) to inject the content (e.g., content 302) into the collaboration session (e.g., IM chat 402) between the two or more users (e.g., users 46 and 48) that the qualifying event has been detected. For example, if CI process 10 detects that users 46 and 48 are in an IM chat and are discussing "Agile Development", as configured via, e.g., GUI 300, CI process 10 may detect a qualifying event, and may notify user 44 that the qualifying event has been detected. CI process 10 may notify user 44 via one or more of the communication platforms discussed herein.

It should be noted that while a request to inject content has been described herein in connection with GUI 300, various other options not shown are possible and a user (e.g., user 44) may configure the request in a variety of ways. For example, user 44 may configure the request to trigger based upon roles of users (e.g., when two "technicians" collaborate) and geographies (e.g., when employees from Boston and Dublin are in a collaboration session). Further, user 44 may configure temporal rules, e.g., where the request may trigger at a specified date/time and/or in a range of specified dates/times. Additionally, if multiple third parties input the same or similar requests for content to be injected in the same collaboration session under the same circumstances, precedence rules configured by, e.g., an administrator may be enforced. While it has been described herein that users 46 and 48 have been entered in GUI 300, this is for illustrative purposes and should not be considered a limitation of the present disclosure. Any number of users may be entered in, e.g., text box 320 to specify who should be present in the collaboration session for content to be injected. Further, one or more groups (e.g., the IT group, the HR group, etc.) of people can be specified to be present in the collaboration session for content to be injected. The groups may be based upon, at least in part, a corporate directory or a LDAP (Lightweight Directory Access Protocol) directory.

Further, in an implementation, the third party may specify where and/or when in the collaboration session the content is injected when a qualifying action ahs been detected. For example, the a third party may configure the content to be injected at the start of the collaboration session, the end of the collaboration session, or at any other point in the collaboration session. Further, the third party may specify a communication platform via which the content will be provided to the users in the collaboration session. For example, while the content has been described above as being injected via the same platform (e.g., IM chat) as the collaboration session is taking place, the third party may configure the content to be injected via one or more of an instant message, an email, a text message, a popup window, or any of the other communication platforms described herein, regardless of the platform over which the collaboration session is actually taking place.

In an embodiment, the request to inject content may be a repeating request and may be configured to repeat any number of times by the third party. Additionally multiple events may be cascaded upon one another, such that content may be injected based upon, at least in part, whether or not a previous request and/or action was satisfied. Further, in an embodiment, the request to inject content can be overridden by one or more users in the collaboration session based upon, at least in part, a particular third party, a particular topic, or roles and relationships of the third party and the users in the collaboration session.

Content may also be injected based upon, at least in part, a location of two or more users. For example, a request to inject content may based upon, at least in part, users 46 an 48 being present at the same meeting or conference. Users 46 and 48 may receive the injected content via, e.g., a data-enabled mobile telephone. For example, if users 46 and 48 are in the same location for a conference, user 44 may request that users 46 and 48 receive text messages (e.g., injected content) to discuss Project X.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (i.e., a client electronic device), partly on the user's computer, as a stand-alone software package, partly on the user's computer and partly on a remote computer or entirely on the remote computer or server (i.e., a server computer). In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures may illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Further, one or more blocks shown in the block diagrams and/or flowchart illustration may not be performed in some implementations or may not be required in some implementations. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A number of embodiments and implementations have been described. Nevertheless, it will be understood that various modifications may be made. Accordingly, other embodiments and implementations are within the scope of the following claims.

What is claimed is:

1. A method comprising:
   receiving, via one or more computing devices, a request from a third party, via a
   graphical user interface utilized by the third party, to inject content into a collaboration session between two or more users, wherein the request includes a selection of the two or more users, a selection of a topic of the collaboration session between the two or more users, and the content to be injected into the collaboration session made by the third party via the graphical user interface;
   monitoring, via the one or more computing devices, one or more communication platforms to detect a qualifying event and a plurality of condition precedents associated with the request from the third party to inject the content into the collaboration session between the two or more users, wherein the qualifying event includes initiation of the collaboration session between the two or more users identified in the request;
   detecting that the two or more users selected by the third party in the request are in the collaboration session as one of the plurality of condition precedents;
   detecting that the topic of the collaboration session between the two or more users selected by the third party in the request is in the collaboration session as another one of the plurality of condition precedents, wherein the request from the third party to inject the content into the collaboration session between the two or more users identifies the topic and the two or more users selected by the third party in the request; and
   in response, at least in part, to detecting the qualifying event and satisfying the plurality of condition precedents associated with the request from the third party to inject the content into the collaboration session between the two or more users, injecting, via the one or more computing devices, the content into the collaboration session between the two or more users based, at least in part, upon an access rule defining a subset of the two or more users to receive the injected content; wherein the injected content includes an associated action corresponding to the topic of the collaboration session.

2. The method of claim 1, further comprising:
   storing the request from the third party to inject the content into the collaboration session between the two or more users in a registry.

3. The method of claim 1, wherein injecting the content into the collaboration session between the two or more users comprises:
   displaying the content requested by the third party to be injected into the collaboration session between the two or more users in the collaboration session between the two or more users.

4. The method of claim 1, further comprising:
   identifying the third party that requested to inject the content into the collaboration session between the two or more users to the two or more users.

5. The method of claim 1, wherein detecting the qualifying event associated with the request from the third party to inject the content into the collaboration session between the two or more users comprises:
   detecting a fuzzy match associated with: the request to inject the content into the collaboration session between the two or more users, and the qualifying event.

6. The method of claim 1, further comprising:
   notifying the third party that requested to inject the content into the collaboration session between the two or more users of whether an action associated with the request to inject the content into the collaboration session between the two or more users was satisfied.

7. The method of claim 1, further comprising:
   notifying the third party that requested to inject the content into the collaboration session between the two or more users that the qualifying event has been detected.

8. The method of claim 1, wherein the collaboration session is at least one of: a telephone call, an instant message chat, a conference call, a unified telephony call, a web conference, an electronic meeting, an email, and a calendaring and scheduling event.

9. A computer program product residing on a non-transitory computer readable storage medium having a plurality of instructions stored thereon, which, when executed by a processor, cause the processor to perform operations comprising:
   receiving a request from a third party, via a graphical user interface utilized by the third party, to inject content into a collaboration session between two or more users, wherein the request includes a selection of the two or more users, a selection of a topic of the collaboration session between the two or more users, and the content to be injected into the collaboration session made by the third party via the graphical user interface;
   monitoring one or more communication platforms to detect a qualifying event and a plurality of condition precedents associated with the request from the third party to inject the content into the collaboration session between the two or more users, wherein the qualifying event includes initiation of the collaboration session between the two or more users identified in the request;

detecting that the two or more users selected by the third party in the request are in the collaboration session as one of the plurality of condition precedents;

detecting that the topic of the collaboration session between the two or more users selected by the third party in the request is in the collaboration session as another one of the plurality of condition precedents, wherein the request from the third party to inject the content into the collaboration session between the two or more users identifies the topic and the two or more users selected by the third party in the request; and in response, at least in part, to detecting the qualifying event and satisfying the plurality of condition precedents associated with the request from the third party to inject the content into the collaboration session between the two or more users, injecting the content into the collaboration session between the two or more users based, at least in part, upon an access rule defining a subset of the two or more users to receive the injected content; wherein the injected content includes an associated action corresponding to the topic of the collaboration session.

10. The computer program product of claim 9, further comprising:

storing the request from the third party to inject the content into the collaboration session between the two or more users in a registry.

11. The computer program product of claim 9, wherein injecting the content into the collaboration session between the two or more users comprises:

displaying the content requested by the third party to be injected into the collaboration session between the two or more users in the collaboration session between the two or more users.

12. The computer program product of claim 9, further comprising:

identifying the third party that requested to inject the content into the collaboration session between the two or more users to the two or more users.

13. The computer program product of claim 9, wherein detecting the qualifying event associated with the request from the third party to inject the content into the collaboration session between the two or more users comprises:

detecting a fuzzy match associated with: the request to inject the content into the collaboration session between the two or more users, and the qualifying event.

14. The computer program product of claim 9, further comprising:

notifying the third party that requested to inject the content into the collaboration session between the two or more users of whether an action associated with the request to inject the content into the collaboration session between the two or more users was satisfied.

15. The computer program product of claim 9, further comprising:

notifying the third party that requested to inject the content into the collaboration session between the two or more users that the qualifying event has been detected.

16. The computer program product of claim 9, wherein the collaboration session is at least one of: a telephone call, an instant message chat, a conference call, a unified telephony call, a web conference, an electronic meeting, an email, and a calendaring and scheduling event.

17. A computing system including one or more processors and one or more memories configured to perform operations comprising:

receiving a request from a third party, via a graphical user interface utilized by the third party, to inject content into a collaboration session between two or more users, wherein the request includes a selection of the two or more users, a selection of a topic of the collaboration session, and the content to be injected into the collaboration session made by the third party via the graphical user interface;

monitoring one or more communication platforms to detect a qualifying event and a plurality of condition precedents associated with the request from the third party to inject the content into the collaboration session between the two or more users, wherein the qualifying event includes initiation of the collaboration session between the two or more users identified in the request;

detecting that the two or more users selected by the third party in the request are in the collaboration session as one of the plurality of condition precedents;

detecting that the topic of the collaboration session between the two or more users selected by the third party in the request is in the collaboration session as another one of the plurality of condition precedents, wherein the request from the third party to inject the content into the collaboration session between the two or more users identifies the topic and the two or more users selected by the third party in the request; and in response, at least in part, to detecting the qualifying event and satisfying the plurality of condition precedents associated with the request from the third party to inject the content into the collaboration session between the two or more users, injecting the content into the collaboration session between the two or more users based, at least in part, upon an access rule defining a subset of the two or more users to receive the injected content; wherein the injected content includes an associated action corresponding to the topic of the collaboration session.

18. The computing system of claim 17, further comprising:

storing the request from the third party to inject the content into the collaboration session between the two or more users in a registry.

19. The computing system of claim 17, further comprising:

displaying the content requested by the third party to be injected into the collaboration session between the two or more users in the collaboration session between the two or more users.

20. The computing system of claim 17, further comprising:

identifying the third party that requested to inject the content into the collaboration session between the two or more users to the two or more users.

21. A method comprising:

receiving, via one or more computing devices, a request through, at least in part, a graphical user interface associated with a collaboration application, to inject content into a collaboration session between two or more users, wherein the request includes a selection of the two or more users, a selection of a topic of the collaboration session, and the content to be injected into the collaboration session made by the third party via the graphical user interface;

monitoring, via the one or more computing devices, one or more communication platforms to detect a qualifying event and a plurality of condition precedents associated with the request from the third party to inject the content into the collaboration session between two or more users, wherein the qualifying event is based upon, at least in part, at least one of: initiation of the collaboration session between the two or more users identified in the request, and the topic of the collaboration session;

detecting that the two or more users selected by the third party in the request are in the collaboration session as one of the plurality of condition precedents;

detecting that the topic of the collaboration session between the two or more users selected by the third party in the request is in the collaboration session as another one of the plurality of condition precedents, wherein the request from the third party to inject the content into the collaboration session between the two or more users identifies the topic and the two or more users selected by the third party in the request; and in response, at least in part, to detecting the qualifying event and satisfying the plurality of condition precedents associated with the request from the third party to inject the content into the collaboration session between the two or more users, injecting, via the one or more computing devices, the content into the collaboration session between the two or more users based, at least in part, upon an access rule defining a subset of the two or more users to receive the injected content, and through, at least in part, at least one of an instant messaging application, a unified telephony application, a web conferencing application, and a text message; wherein the injected content includes an associated action corresponding to the topic of the collaboration session.

\* \* \* \* \*